United States Patent [19]

Liautaud et al.

[11] Patent Number: 4,532,194
[45] Date of Patent: Jul. 30, 1985

[54] HOUSING FOR A BATTERY OPERATED TRANSCEIVER

[75] Inventors: James P. Liautaud, River and Bluff Rds., Trout Valley, Cary, Ill. 60013; Peter F. Stultz, Elgin; David L. Maloney, Barrington, both of Ill.

[73] Assignee: James P. Liautaud, Cary, Ill.

[21] Appl. No.: 530,050

[22] Filed: Sep. 7, 1983

[51] Int. Cl.³ .............................................. H01M 2/10
[52] U.S. Cl. ..................................... 429/99; 429/121; 429/159; 429/163
[58] Field of Search ...................... 429/8, 9, 96, 97, 98, 429/99, 100, 151, 159, 163, 176, 175, 121, 122

[56] References Cited

U.S. PATENT DOCUMENTS

| 3,999,110 | 12/1976 | Ramstrom et al. | 429/96 |
| 4,072,800 | 2/1978 | Gammer | 429/97 |
| 4,206,274 | 6/1980 | Peels | 429/99 |

Primary Examiner—Anthony Skapars
Attorney, Agent, or Firm—Lockwood, Alex, Fitzgibbon & Cummings

[57] ABSTRACT

A housing for a battery operated portable transceiver includes an elongated generally rectangular housing. A battery pack received in a recess in the housing forms in part a surface for gripping the housing. A combined latch and contact arrangement retains the battery pack in position and establishes electrical contact between the battery pack and the transceiver. A protective boot fitted to the lower end of the housing protects the transceiver from physical shock.

9 Claims, 9 Drawing Figures

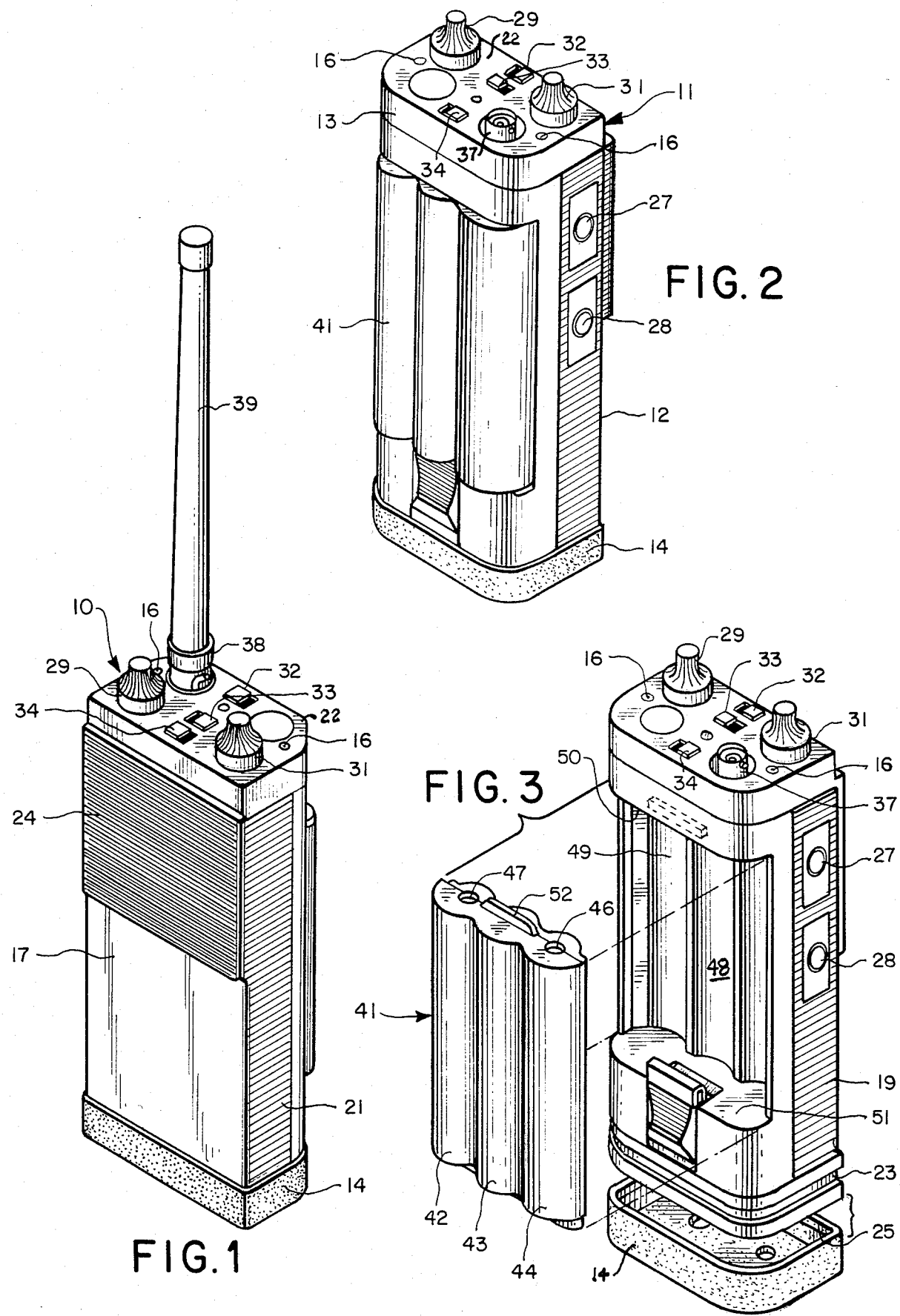

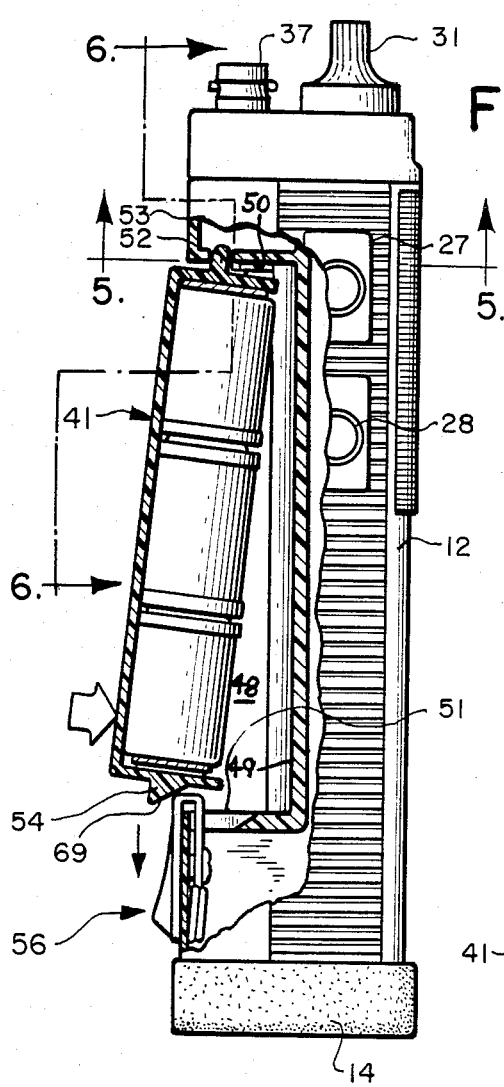
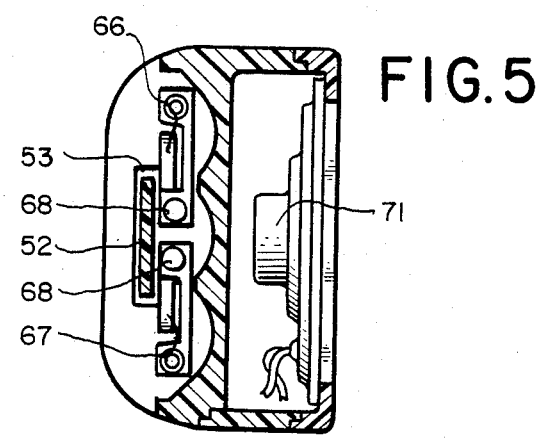
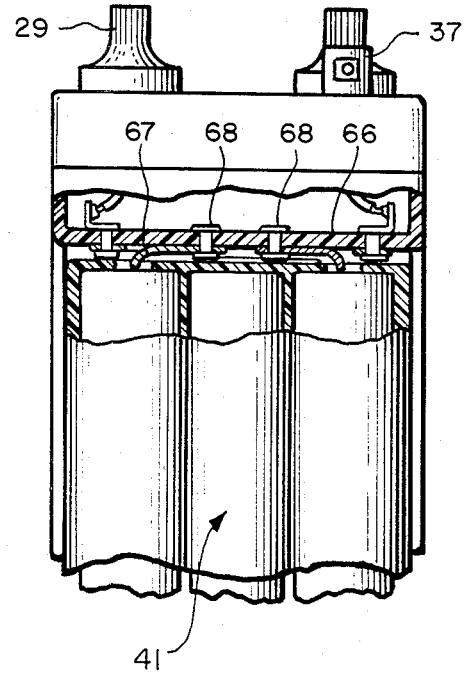
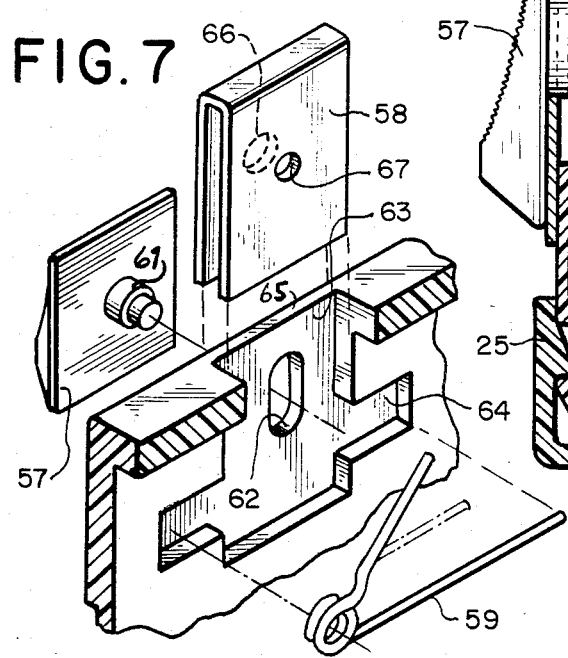
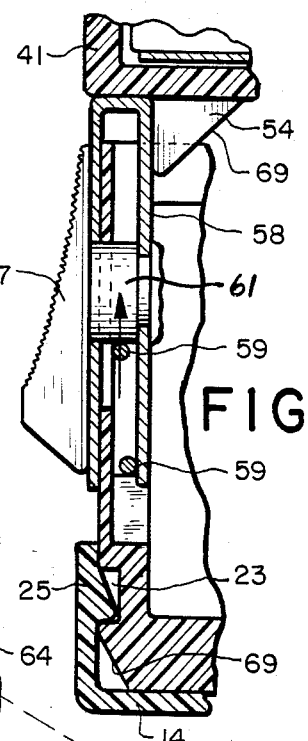
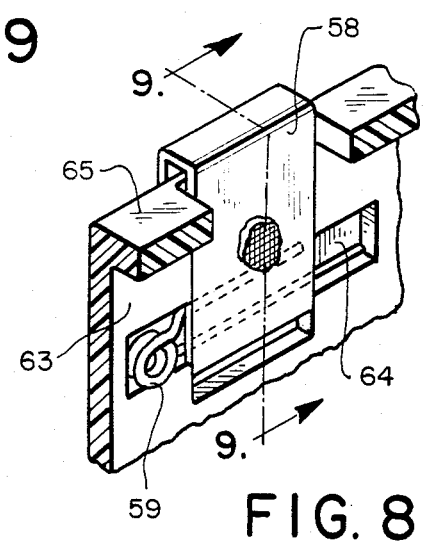

4,532,194

HOUSING FOR A BATTERY OPERATED TRANSCEIVER

BACKGROUND OF THE INVENTION

This invention relates generally to enclosures for electronic equipment, and more specifically to a housing for a handheld battery-operated transceiver.

Portable battery-operated transceivers, which are frequently operated in adverse environments, require housings which provide the circuitry of the transceiver with protection from mechanical shock, and from contaminants and harmful elements such as dirt, grime and moisture frequently present where the transceivers are used. Consequently, a transceiver housing should be constructed so as to be mechanically rugged and sealed against outside elements.

Since handheld portable transceivers are intended to be operated while held in one hand, it is desirable that the housings of such units allow easy and natural manipulation of the transceiver controls while held in the operating position. Consequently, the housings should be dimensioned so as to easily and comfortably fit within the hand. Abrupt edges, particularly along the rear surface of the unit, which could result in discomfort while handling the unit, should be avoided. Furthermore, the housing should be light in weight for ease of carrying and handling. Furthermore, the housing should allow the internal components of the unit to be so arranged as to avoid a concentration of weight near the ends of the unit, to avoid the transceiver being unbalanced, and therefore awkward to use.

One problem of battery-operated transceivers is the necessity of removing the batteries for charging or replacement. In those previous constructions wherein the batteries have been contained in a compartment, it was necessary to provide a relatively complex and expensive door arrangement to enclose the batteries, and a relatively complex and expensive contact arrangement to establish electrical communication between the batteries and the transceiver circuitry.

The present invention avoids this arrangement by providing a housing wherein the batteries are contained within a removable battery pack. The battery pack is secured within a recess in the housing at one end by a simple tab arrangement, and at the other end by a simple user-actuated latch which cooperates with the contacts to latch the battery pack in position. Electrical contact is provided by two spring contacts adjacent the upper tab. Removal of the battery pack requires only actuation of the latch, the spring contacts functioning to assist the operator in removing the battery pack.

When seated in the recess of the transceiver housing, the exposed surface of the battery pack cooperates with the exterior surface of the housing to form a comfortable easily grippable surface.

This is accomplished without undesirable complication of the housing, thereby achieving a low cost of manufacture.

Accordingly, it is a general object of the invention to provide a new and improved housing for a battery operated portable handheld transceiver.

It is a more specific object of the invention to provide a housing for a portable transceiver which protects the transceiver against mechanical shock and contaminants.

It is still another important object of this invention to provide a housing for a portable transceiver having a removable battery pack which includes an economical combined latch and contact arrangement for holding the pack in position in the housing.

SUMMARY OF THE INVENTION

The invention is directed to a housing for a battery operated portable transceiver having a battery pack and an elongated generally rectangular main housing portion. The main housing portion has a recessed portion in the rear surface thereof which is dimensioned so as to snugly engage the front surface of the battery pack. Electrical contact means disposed within the recessed portion of the main housing portion provide electrical contact between circuitry contained within the main housing portion and the battery pack. User actuable latch means retain the battery pack within the recessed portion of the main housing portion.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a perspective view of a battery powered handheld transceiver constructed in accordance with the invention.

FIG. 2 is a rear perspective view of the transceiver showing the battery pack thereof installed therein.

FIG. 3 is an exploded rear perspective view of the housing showing the battery pack and the protective boot thereof displaced from their normal positions.

FIG. 4 is a side elevational view partially in section showing the installation of the battery pack into the housing.

FIG. 5 is a cross-sectonal view taken along line 5—5 of FIG. 4 showing the battery pack installed in the housing.

FIG. 6 is a view taken along line 6—6 of FIG. 4, showing the manner of electrical contact between the battery pack and the transceiver unit.

FIG. 7 is an exploded perspective view of the principal components of the latch mechanism for retaining the battery pack in position within the transceiver housing.

FIG. 8 is a perspective view of the principal components of the latch mechanism assembled in the transceiver housing.

FIG. 9 is a cross-sectional view of the latch mechanism taken along line 9—9 of FIG. 8.

DESCRIPTION OF THE PREFERRED EMBODIMENT

Referring to the figures, and particularly to FIGS. 1-3, a battery operated portable handheld transceiver constructed in accordance with the invention is indicated generally by reference numeral 10. The transceiver 10 is seen to include a generally rectangular housing 11, which further includes an elongated main housing portion 12, a top end cap 13 and a protective boot 14. Both the main housing portion 12 and top end cap 13 are molded from rigid plastic or similar impact resistent material, while the protective boot 14 is formed of a pliable rubber. Top end cap 13 is dimensioned so as to detachably engage the upper edge of the main housing portion 12 and in normal use, is rigidly held in place by means of Allen screws 16 extending through suitable apertures in the end cap to engage threads in the main housing portion 12.

The housing 11 is generally rectangular in form, and includes a front surface 17, a rear surface 18, a top surface 22, and right and left side surfaces 19 and 21, respectively. The rear portion of housing 11 is provided with a groove 23, generally rectangular in section, extending around the base of the housing adjacent the bottom thereof as shown in FIG. 3. A similarly dimensioned ridge 25 provided along the interior surface of protective boot 14 engages groove 23 to secure the protective boot to the bottom portion of housing 11.

The front surface 17 of the transceiver housing is provided with a speaker grill portion 24 behind which is mounted the speaker/microphone of the transceiver unit. The grill portion 24 includes a series of parallel, raised, spaced-apart ribs, extending horizontally across the upper section of the front surface. Right and left side surfaces 19 and 21 are each provided with a series of spaced, parallel horizontal grooves or serrations to provide a gripping surface for the transceiver housing. When the transceiver housing is held in the hand the right and left side serrations naturally contact the palm and fingertips to provide a firm grip on the transceiver unit. The right side surface of the housing further includes two generally rectangular openings containing push-button switches 27 and 28, which control the transmit and receive functions of the transmitter. These openings are so located as to fall naturally under the tips of the index and middle fingers when the transceiver is held in the right hand. When held in the left hand, the thumb can easily depress the push-button switches.

The upper surface 22 of the transceiver contains controls for controlling various functions of the transceiver. Among these are the volume and squelch controls 29 and 31, respectively, mounted adjacent the two front corners of the unit. Squelch and volume controls 29 and 31 are each fitted with control knobs such as those shown in the copending application of James P. Liautaud et al, Ser. No. 529,956, filed Sept. 6, 1983. Slide switches 32, 33 and 34 control the channel select, private-line and power ON/OFF functions of the transceiver, respectively. These various controls are mounted on an internally located circuit board and extend upwardly through suitable apertures provided in the upper surface of end cap 13. An RF connector 37 extending upwardly through an aperture provided in end cap 13 engages a mating connector 38 of a flexible antenna 39 to connect the transceiver unit with the antenna.

The rear surface of the main housing portion 12 is adapted to receive and retain a battery pack 41 containing the battery which provides electrical power, thereby allowing portable use of the transceiver. The battery pack 41 has the general form of three adjacent vertical cylindrical columns 42, 43 and 44 in parallel spaced alignment, and is arranged so that each of the columns extends vertically along the rear surface of the transceiver unit. The rear surface of battery pack 41 forms the rear surface of the transceiver housing 11, and is rounded to permit comfortable handheld use of the transceiver. The individual cells forming the battery are contained within the three vertical columns and are stacked upon each other as shown in FIG. 4. The individual cells are electrically interconnected in a known manner to form the battery.

The upper surface of the battery pack 41 is provided with circular apertures 46 and 47 aligned concentrically with columns 42 and 44 to provide access to the electrical contact of the cell positioned immediately beneath each aperture. This arrangement allows electrical contact to be made to the battery pack 41 through the apertures.

By reference to FIG. 4, the main housing portion 12 is seen to include a recess-portion 48 into which the battery pack 41 is inserted during normal operation of the transceiver. The interior vertical surface 49 of the recess-portion 48 contains three vertical, parallel grooves conforming in shape to the interior or front surface of the battery pack. The recess-portion also includes upper and lower horizontal surfaces 50 and 51 each extending from vertical surface 49 to the exterior of housing 11. The upper surface of battery pack 41 is also provided with a substantially flat rectangular tab portion 52 extending vertically from the center column 43 of the battery pack, and is dimensioned so as to be received within a rectangular channel 53 provided in the upper surface of the cutaway portion 48 of the housing in which the battery pack 41 is received to hold the upper end of the battery pack unit in place. The lower end of battery pack 41 is held in place in the transceiver by means of a similar tab 54 extending vertically from the lower surface of the battery pack unit. Tab 54 is dimensioned so as to engage a locking surface of a latch mechanism indicated generally by reference numeral 56.

By reference to FIG. 7, the latch mechanism is seen to include an actuator member 57, a locking plate 58 and a wire spring 59. As shown in FIGS. 2 and 3, the actuator 57 is exposed along the rear surface of the transceiver housing 11, and is slidably received in a suitably dimensioned groove therein. The actuator 57 is provided with a series of horizontal parallel spaced serrations in order to facilitate operation of the latch mechanism by means of finger pressure. The unexposed side of actuator 57 includes a generally cylindrical boss 61 of two different diameters, extending outwardly from the surface of the actuator, the smaller diameter being at the free end of the boss. When actuator 57 is installed, boss 61 extends through an elongated aperture 62 provided in the rear surface of the transceiver housing. Vertical motion of the actuator is thus limited to the travel of the boss 61 within the elongated aperture 62. The locking plate 58 formed of sheet metal or similar durable material, is generally U-shaped so as to slide over the edge 65 of the housing unit surface as shown in FIGS. 7 and 9.

The interior surface of the housing unit 11 contains channels 63 and 64 (FIG. 7) formed at the time the main housing portion 12 is molded. Channel 63 is dimensioned so as to receive the generally U-shaped locking plate 58, thereby allowing vertical movement of the locking plate with respect to the housing. Apertures 66 and 67 provided in locking plate 58 engage the different diameter portions of boss 61 extending therethrough, to cause the locking plate to move in conformance with movement of the actuator. At the time of manufacture, the locking plate 58 is positioned within channel 63, so that apertures 66 and 67 align with aperture 62 in the rear surface of the housing unit. Actuator 57 is then positioned so that boss 61 simultaneously extends through apertures 66, 62 and 67. When the components are thus positioned, the free end of boss 61 protruding through aperture 67, may be deformed, as with a heated tool, to lock the assembly together.

Spring 59 is normally disposed within channel 64 as shown in FIGS. 7, 8 and 9 and serves to provide an upwardly directed bias force against the latch mechanism. With this arrangement, the latch mechanism is vertically displaceable over the limits of travel established by the travel of boss 61 within the elongated aperture 62. In the usual or normal position, the latch mechanism is maintained in the position shown in FIG. 8, by reason of the restoring force provided by wire spring 59. With the latch mechanism in the position shown, the locking plate 58 retains the lower end of battery pack unit 41 in position.

The actuator 57 of the latch unit 56 may be displaced downward by means of finger pressure applied to the latch in the direction shown by the arrow in FIG. 4. When the latch mechanism is thus downwardly displaced, the locking plate 58 disengages tab 54 to allow the battery pack unit 41 to be removed from the transceiver housing.

Tab 54 extending from the bottom surface of the battery pack unit includes an inwardly directed sloped surface 69 shown in FIGS. 4 and 9. As shown in FIG. 4, the sloped surface provides cam means for downwardly displacing the latch mechanism as the battery pack unit is snapped in place. This allows the battery pack unit to be snapped in place in a transceiver unit without the need for simultaneously manually depressing the latch unit actuator member 57.

FIG. 6 illustrates the manner in which electrical contact is established between the circuitry of the transceiver, and the terminals of the battery pack 41. The upper surface 50 of the recessed portion 51 into which the battery unit is installed is provided with two electrical contacts 66 and 67 which establish contact with the positive and negative polarity terminals, respectively, of the battery pack. Terminals 66 and 67 are each held in place by means of rivets 68 extending through each contact and the transceiver housing as shown. Electrical contacts 66 and 67 are each fashioned from a resilient, conducting material. When the battery pack 41 is in place as shown in FIG. 6, contacts 66 and 67 extend through apertures 46 and 47, respectively, to contact the terminals of the battery located thereunder. The inherent spring bias of each contact helps assure positive and reliable electrical contact to the battery. Electrical contacts 66 and 67 are dimensioned so that with the battery pack unit 41 in place, the contacts are displaced upward, thereby assuring reliable electrical contact by reason of the resulting spring force of the contacts against the battery terminals.

FIG. 5 is another view of the electrical spring contact arrangement, and further shows the engagement of tab 52 with generally rectangular channel 53 to lock the upper portion of the battery pack unit to the transceiver housing.

Two-way portable transceivers are frequently damaged when the unit slips from the hand of the user and falls to the ground. In order to protect the transceiver from injury in the event of such a fall, the housing is provided with resilient cushion means in the form of a protective boot 14 fitted along the exterior bottom portion of the transceiver housing. Such a boot may be fashioned from pliable rubber or similar cushioning material and is so dimensioned as to provide protection to the unit in the event of a fall from a height of approximately three feet. In one commercial embodiment, such a boot is formed of injection molded rubber and may have a thickness of approximately one-quarter of an inch.

FIG. 9 illustrates the means by which the protective boot 14 is attached to the lower portion of the transceiver housing. The interior rib 25 is received within groove 23 to secure the protective boot in the position as shown. The lower horizontal surface of the interior rib 25 is flat, and engages the flat lower horizontal surface of the generally rectangular cross-sectioned channel. Consequently, the protective boot will resist downwardly directed forces by reason of this engagement. Since the protective boot is fashioned from a pliable rubber, it may be deformed by an outwardly directed force along the upper edges thereof to allow removal of the boot from the radio housing when desired. The vertical surface of rib 25 is inclined toward the interior surface of the boot and during installation slidably engages a similarly inclined surface 69 provided along the lower outer vertical surface of the transceiver housing. With this arrangement, the protective boot may easily be installed on the transceiver housing by firmly pressing the transceiver into the boot. The inclined surfaces will automatically displace the upper portion of the boot in an outward direction until the interior rib 25 snaps into the rectangular groove 23 to lock the boot in position.

In order to provide a unit which may confortably be operated with one hand, the housing is constructed so as to avoid sharp edges along the side and rear surfaces where the unit contacts the hand. Consequently, the rear corners of the unit are rounded as is the exterior rear surface of the battery pack 41. It is a feature of the housing, that although rounded surfaces are provided along the rear surface of the unit, the three parallel cylindrical portions forming the battery pack unit provide a stable surface upon which the transceiver unit may be rested when not in use. Similarly, the substantially flat front surface of the unit allows the unit to be safely placed face down on the table or other substantially flat and horizontal surface without danger of the unit rolling away on its own.

By further reference to FIG. 5, it can be seen that the substantially flat front surface provided by the transceiver housing allows a speaker/microphone of a diameter only slightly less than the width of the unit to be positioned immediately behind the grill portion of the front surface, without having the front surface of the unit extend substantially beyond the forward edge of the speaker. With this arrangement, undue thickness of the transceiver unit is avoided.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A housing for a battery operated portable transceiver, comprising:
    a battery pack including a battery pack housing, said battery pack housing defining a chamber for receiving a battery and having a pair of apertures for providing access to terminals on said battery;
    an elongated generally rectangular main housing portion having a recess-portion in the rear surface thereof, said recess-portion being dimensioned to receive said battery pack;

detachable mechanical engagement means including a pair of electrical contacts disposed within said recess at one end thereof for mechanically engaging one end of said battery pack; and user-actuable latch means at the other end of said recess for engaging the other end of said battery pack to retain said battery pack within said recess-portion of said main housing portion;

said electrical contacts being located as to project through said apertures and into contact with said terminals to provide electrical communication between circuitry contained within said main housing portion and said battery pack when said battery pack is received in said recess-portion.

2. A housing as defined in claim 1 wherein said battery comprises a plurality of cylindrical cells, and the shape of the rear surface of said battery pack housing conforms generally to the shape of said cylindrical cells.

3. A housing as defined in claim 2 wherein the rear vertical corners of said main housing portion are rounded such that said housing fits comfortably within the hand of a user.

4. A housing as defined in claim 1 wherein said electrical contact means comprise a pair of resiliently biased metallic electrical contacts each compressively engaging a corresponding terminal of said battery when said battery pack is received in said recess-portion.

5. A housing as defined in claim 1 wherein said latch means further comprise an actuator member having a projecting boss on the rear surface thereof, said actuator member being received in a suitably dimensioned groove provided in the rear surface of said main housing portion;

a locking plate having apertures for engaging said boss; and spring means for biasing said actuator member and said locking plate upwardly in said groove in said rear surface.

6. A housing as defined in claim 5 wherein said battery pack housing includes a downwardly projecting tab on the lower horizontal surface thereof for engaging said locking plate of said latch means whereby said lower end of said battery is retained in said recess-portion.

7. A housing as defined in claim 6, wherein said battery pack housing includes a tab projecting from a surface thereof for engaging a complementary shaped recess in the upper surface of said recess whereby said upper end of said battery pack is retained in said recess.

8. A housing for a battery operated portable transceiver comprising an elongated generally rectangular main housing portion including at one end thereof a protective boot formed of a flexible resilient cushioning material, said protective boot being generally hollow and open at one end to define an interior region, said end of said housing being received in said interior region. said main housing portion includes a groove extending around the lower portion thereof adjacent said one end for engaging a complementary shaped inwardly projecting engaging surface formed around the interior surface of said interior region of said protective boot whereby said protective boot is removably attached to said main housing.

9. A housing as defined in claim 8 wherein said forwardly projecting engaging surface includes an inclined portion such that said protective boot may be installed on said main housing by pressing said main housing into said interior region.

* * * * *